United States Patent
Kaihara et al.

[11] Patent Number: 5,179,606
[45] Date of Patent: Jan. 12, 1993

[54] OPTICAL COUPLER

[75] Inventors: Shigeru Kaihara; Keiichi Takahashi, both of Tokyo, Japan

[73] Assignee: NEC Corporation, Tokyo, Japan

[21] Appl. No.: 524,566

[22] Filed: May 17, 1990

[30] Foreign Application Priority Data

May 19, 1989 [JP] Japan .................. 1-124223

[51] Int. Cl.⁵ .................. G02B 6/26; G02B 6/42
[52] U.S. Cl. .................................................. 385/45
[58] Field of Search .................. 350/96.15, 96.16; 385/39, 44, 45

[56] References Cited

U.S. PATENT DOCUMENTS

| | | | |
|---|---|---|---|
| 4,486,071 | 12/1984 | Levinson | 350/96.15 |
| 4,637,682 | 1/1987 | Mahlein et al. | 350/96.15 |
| 4,674,827 | 6/1987 | Izutsu et al. | 385/45 |
| 4,744,621 | 5/1988 | Tanabe et al. | 350/96.20 |
| 4,820,009 | 4/1989 | Thaniyavarn | 385/45 |
| 4,860,294 | 8/1989 | Winzer et al. | 385/45 |
| 4,906,068 | 3/1990 | Olson et al. | 350/96.15 |
| 4,907,853 | 3/1990 | Hiratsuka | 350/96.20 |
| 4,923,268 | 5/1990 | Xu | 350/96.15 |
| 4,958,897 | 9/1990 | Yanagawa et al. | 350/96.15 |
| 4,961,801 | 10/1990 | Gasparian | 350/96.15 |
| 5,007,705 | 4/1991 | Morey et al. | 350/96.15 |
| 5,048,909 | 9/1991 | Henry et al. | 385/45 |

Primary Examiner—John D. Lee
Assistant Examiner—Robert E. Wise
Attorney, Agent, or Firm—Leydig, Voit & Mayer

[57] ABSTRACT

In an optical coupler for dividing or combining lights of different wavelengths, at least one wavelength separating filter connector terminal is provided at least one light input and output terminals. The wavelength separating filter connector comprises first and second optical fibers which are in contact with each other by placing an optical wavelength separating filter film between the first and second optical fibers, so that an isolation is large between separated lights.

17 Claims, 6 Drawing Sheets

OPTICAL COUPLER

FIELD OF THE INVENTION

This invention relates to an optical coupler, and more particularly, to an optical coupler in which wavelength division multiplexing lights having more than two different wavelengths are divided into more than two separated lights, and vice versa.

BACKGROUND OF THE INVENTION

One type of a conventional optical coupler is of a bulk type which comprises first and second rod lenses, and a wavelength separating filter sandwiched by the first and second rod lenses.

In operation, lights having wavelengths $\lambda_1$ and $\lambda_2$ are incident to the first rod lens and propagated therethrough to be supplied to the wavelength separating filter, so that the light of the wavelength $\lambda_1$ and the light of the wavelength $\lambda_2$ are separated by the wavelength separating filter. The light of the wavelength $\lambda_1$ is then passed through the wavelength separating filter to be propagated through the second rod lens, while the light of the wavelength $\lambda_2$ is then reflected by the wavelength separating filter, so that the light of the wavelength $\lambda_2$ is propagated in a direction opposite to the incident direction through the first rod lens. Consequently, the light of the wavelength $\lambda_1$ is obtained from the second rod lens, while the light of the wavelength $\lambda_2$ is obtained from the first rod lens.

Another type of a conventional optical coupler is an optical fiber fusing type which comprises a pair of optical fibers, cladding layers of which are fused side by side, such that cores of the optical fibers are adjacent to each other to provide an evanescent field coupling.

In operation, wavelength division multiplexing lights having wavelengths $\lambda_1$ and $\lambda_2$ are incident to one of the optical fibers and propagated therethrough to be supplied to a fused portion, so that the light of the wavelength $\lambda_2$ is almost all coupled in the fused portion to the other optical fiber. Consequently, the light of the wavelength $\lambda_1$ is obtained at an output end from one of the optical fibers, while the light of the wavelength $\lambda_2$ is obtained at an output end from the other optical fiber.

However, the bulk type optical coupler has disadvantages in that the number of parts including terminals and connectors (to be explained later) are large which increases the number of assembling steps, and makes it difficult to decrease the insertion loss; although the advantage is the property of isolating the separated lights of the wavelength $\lambda_1$ and $\lambda_2$.

Similarily, the fiber fusing type optical coupler has a disadvantage in that the isolation between the separated lights of the wavelengths $\lambda_1$ and $\lambda_2$ is not large as expected, although it has advantages in that the number of parts is small to decrease the number of assembling steps, and the insertion loss is small.

SUMMARY OF THE INVENTION

Accordingly, it is an object of the invention to provide an optical coupler which is assembled using a small number of parts.

It is a further object of the invention to provide an optical coupler which is assembled using a small number of steps.

It is a still further object of the invention to provide the optical coupler in which an insertion loss is small.

It is a yet still further object of the invention to provide the optical coupler in which an isolation is large between separated lights of different wavelengths.

In accordance with one aspect of the invention, in an optical coupler having plural light input and output terminals in which lights of more than two different wavelengths are combined or divided, an optical connector terminal is provided at at least one of the light input and output terminals. The optical connector terminal includes an optical wavelength separating filter film positioned between end planes of first and second optical fibers. The first optical fiber is provided in advance with the optical wavelength separating filter film on the end plane of the first optical fiber. The first and second optical fibers are operatively connected with each other by placing the optical wavelength separating filter film between them. The optical connector terminal comprises a capillary tube and a refractive index matching material. The capillary tube has an aperture into which the first and second optical fibers are inserted and the refractive index matching material is filled into a contacting portion of the first and second optical fibers.

According to a second aspect of the invention, an optical coupler in which lights of more than two different wavelengths are combined or divided comprises a coupler portion, at least two light input and output terminals connected to the coupler portion, and an optical connector terminal provided at at least one of the light input and output terminals. The optical connector terminal includes an optical wavelength separating filter film inserted between end planes of first and second optical fibers which are operatively connected with each other by placing the optical wavelength separating filter film between them. The end planes of the first and second optical fibers are adjacent to the filter and are at different angles which allow a refractive index matching material to fill between the first and second optical fibers.

According to a third aspect of the invention, an optical coupler comprises first and second optical fibers, a first connector terminal, and a second connector terminal. The first and second optical fibers are joined along a fused portion and have first ends which extend from one end of the fused portion. A first connector terminal is mounted to the first end of the first optical fiber and includes a filter at the tip of the first optical fiber for passing light having a first optical wavelength. The second connector terminal is mounted to the first end of the second optical fiber and includes a filter at the tip of the second optical fiber for passing light having a second optical wavelength.

BRIEF DESCRIPTION OF THE DRAWINGS

This invention will be explained in more detail in conjunction with appended drawings, wherein.

DESCRIPTION OF THE PREFERRED EMBODIMENTS

Before explaining an optical coupler in the first preferred embodiment according to the invention, the aforementioned bulk and fusing type optical couplers will be explained in conjunction with FIGS. 1 and 2.

Figure 1:
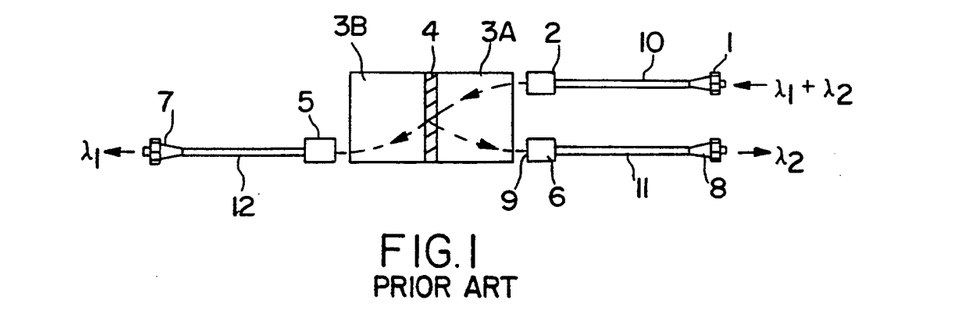
FIG. 1 is an explanatory diagram showing a bulk type of a conventional optical coupler.

FIG. 1 shows the bulk type optical coupler which comprises first and second rod lenses 3A and 3B, and a wavelength separating filter 4 sandwiched by the first and second rod lenses 3A and 3B. The first rod lens 3A is coupled to first and second optical fibers (not shown) by optical fiber cords 10 and 11 which have connectors 1 and 8, and terminals 2 and 6, respectively, at both ends, such that the optical fiber cord 10 is connected through the connector 1 to the first optical fiber, and coupled through the terminal 2 to a first plane of the rod lens 3A, while the optical fiber cord 11 is connected through the connector 8 to the second optical fiber, and coupled through the terminal 6 having a filter 9 on an input plane thereof to the first plane of the rod lens 3A. The second rod lens 3B is coupled to a third optical fiber (not shown) by an optical fiber cord 12 which has a connector 7 and a terminal 5 at both ends, such that the optical fiber cord 12 is connected through the connector 7 to the third optical fiber, and coupled through the terminal 5 to a second plane of the rod lens 3B.

In operation, wavelength division multiplexing lights having wavelengths $\lambda_1$ and $\lambda_2$ are supplied from the first optical fiber through the optical fiber cord 10 to the first rod lens 3A, and are separated by the wavelength separating filter 4, so that the light of the wavelength $\lambda_1$ is propagated through the rod lens 3B to be supplied through the optical fiber cord 12 to the third optical fiber, while the light of the wavelength $\lambda_2$ is propagated through the rod lens 3A to be supplied through the optical fiber cord 11 to the second optical fiber. Where the light of the wavelength $\lambda_2$ is partially supplied to the terminal 6, it is interrupted to be propagated through the optical fiber cord 11 by the filter 9.

Figure 2:
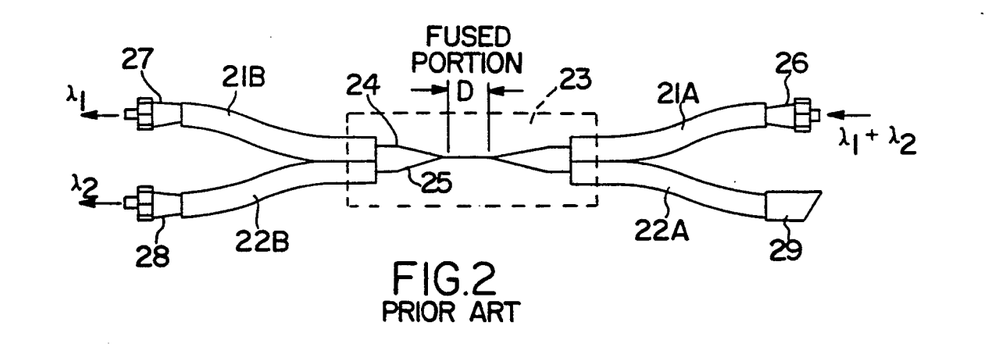
FIG. 2 is an explanatory diagram showing an optical fiber fusing type of a conventional optical coupler.

FIG. 2 shows the fusing type optical coupler comprising first to fourth optical fiber cords 21A, 21B, 22A and 22B having optical fibers 24 and 25 which are adjacent to be parallel in a fused length of "D" at a coupler portion 23. The first and second optical fiber cords 21A and 21B have connectors 26 and 27 at both ends to be connected to optical fibers (not shown). While, the fourth optical fiber cord 22B has a connector 28 at one end to be connected to an optical fiber (not shown), and the third optical fiber cord 22A is terminated at the other end by a slant-polished terminal 29.

Figure 3A:
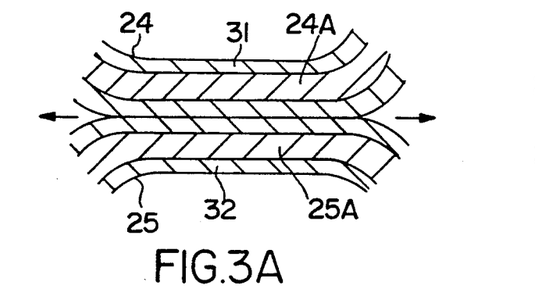
FIGS. 3A to 3C are cross-sectional view showing a process for fabricating the conventional fusing type optical coupler.
Figure 3B:
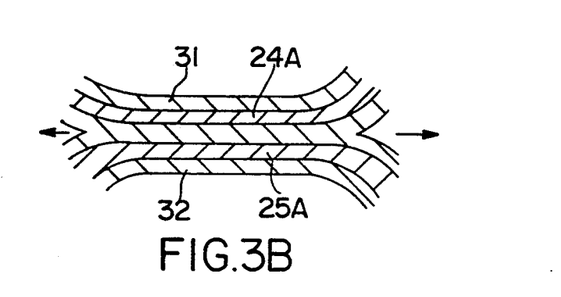
Figure 3C:
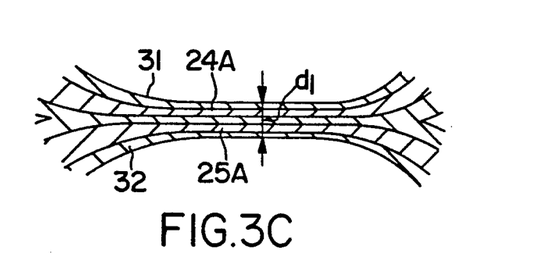

The fusing type optical coupler is fabricated as shown in FIGS. 3A to 3C.

At first, the optical fibers 24 and 25 are made parallel to be in contact on cladding layers 31 and 32 provided around the cores 24A and 25A side by side, and then heated to be expanded in an axial direction as shown in FIG. 3A. These heating and expanding are continued, so that the cladding layers 31 and 32 are fused to each other, and the cores 24A and 25A become narrower as shown in FIG. 3B. Finally, the cores 24A and 25A are adjacent to be parallel to provide the fused portion D having an outer diameter $d_1$ which is less than 50 $\mu$m as shown in FIG. 3C.

Figure 4A:
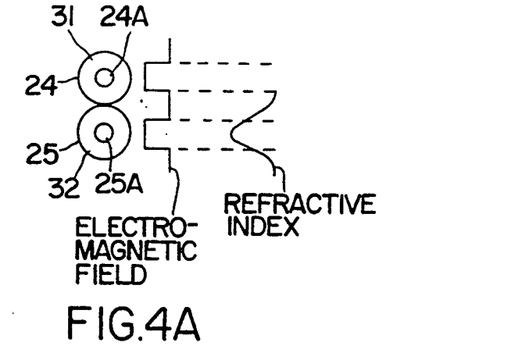
FIGS. 4A to 4C are explanatory diagrams showing cross-sections, refractive indexes, and electromagnetic fields in the optical coupler fabricated in FIGS. 3A to 3C, FIGS. 5A and 5B are cross-sectional views showing a process for assembling an optical wavelength separating filter connector applied to an optical coupler according to the invention.
Figure 4B:
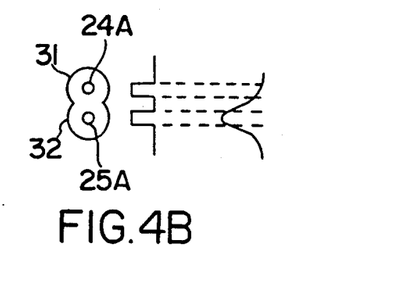
Figure 4C:
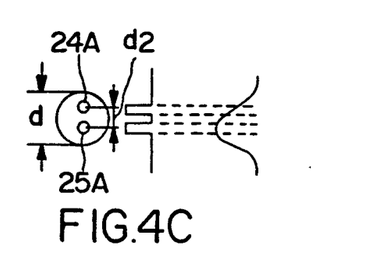

FIGS. 4A to 4C correspond to FIGS. 3A to 3C, and show a cross-section of the processed optical fibers 24 and 25, refractive indexes in a radial direction, and an electromagnetic field distribution in the radial direction.

In operation, when wavelength division multiplexing lights having wavelengths $\lambda_1$ and $\lambda_2$ are supplied to the first optical fiber code 21A at the end of the connector 26, the light of the wavelength $\lambda_1$ is obtained from the second optical fiber cord 21B at the end of the connector 27, while the light of the wavelength $\lambda_2$ is obtained from the fourth optical fiber cord 22B at the end of the connector 28. Here, if it is assumed that an input light power of the wavelength division multiplexing lights having the wavelengths $\lambda_1$ and $\lambda_2$ is $P_0$, output light powers $P_1$ and $P_2$ of the separated lights are defined in the equations (1) and (2).

$$P_1 = P_0 \cos^2 (CZ) \tag{1}$$

$$P_2 = P_0 \sin^2 (CZ) \tag{2}$$

where C is a coupling coefficient which is defined by the equation (3), and Z is a coupling length.

$$C = \frac{\lambda}{2\pi n} \cdot \frac{U^2}{a^2 V^2} \cdot \frac{K_0(W \cdot d_2/a)}{K_1^2(W)} \tag{3}$$

where $\lambda$ is a wavelength of light, $n_1$ and $n_2$ are refractive indexes of the cores and the cladding layers, V is a normalized frequency defined by the equation:

$$\left( V = \frac{2\pi a}{\lambda} \sqrt{n_1^2 - n_2^2} \right),$$

a is a diameter of the cores, U is defined by the equation: $[U = 2.405 \exp\{-(1-\delta/2)/V\}]$, $\delta$ is defined by the equation: $\{S = 1 - (n_2/n_1)^2\}$, W is defined by the equation: $(W = \sqrt{V^2 - U^2})$, and $K_n$ is an n-order Bessel function (n=0, 1).

As apparent from the equations (1) and (2), a coupling degree changes in a period of "$2\pi/c$" and $\lambda$, as the coupling length Z is increased. Thus, the fusing type optical coupler is designed to be fabricated as shown in FIG. 2, FIGS. 3A to 3C, and FIGS. 4A to 4C, wherein the diameter of the cores 24A and 25A becomes small to provide an electromagnetic field leaked from the core 25A to the core 24A, especially, as shown in FIG. 4C. This is defined as "an evanescent field coupling".

Next, an optical coupler in the first preferred embodiment according to the invention will be explained in FIGS. 5A and 5B, and FIG. 6.

Figure 5A:
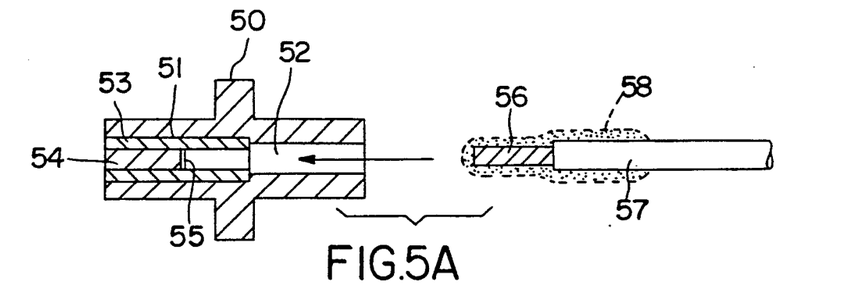

In FIG. 5A, a ferrule 50 is prepared to have a first aperture 51 and a second aperture 52 communicating with the first aperture 51 and having a diameter smaller than that of the first aperture 51. A capillary tube 53 is inserted into the first aperture 51 of the ferrule 50, wherein an optical fiber 54 having a wavelength separating filter 55 on a tip end thereof is fixed in an approximate midst of the capillary tube 53.

On the other hand, another optical fiber 56 is prepared to be exposed at one end from a stripped jacket 57, and is coated with adhesives 58 having a refractive index matching function as shown in FIG. 5A.

Figure 5B:
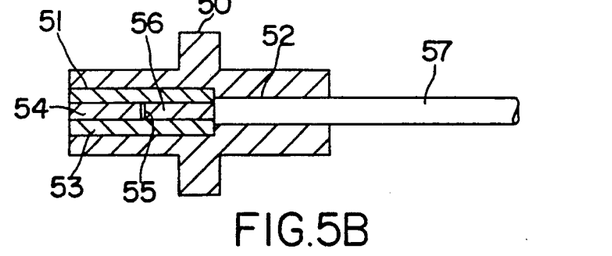

Then, the optical fiber 56 is inserted through the second aperture 52 of the ferrule 50 into the capillary tube 53, so that the optical fibers 54 and 56 are in contact at the tip ends with each other as shown in FIG. 5B.

Figure 6:
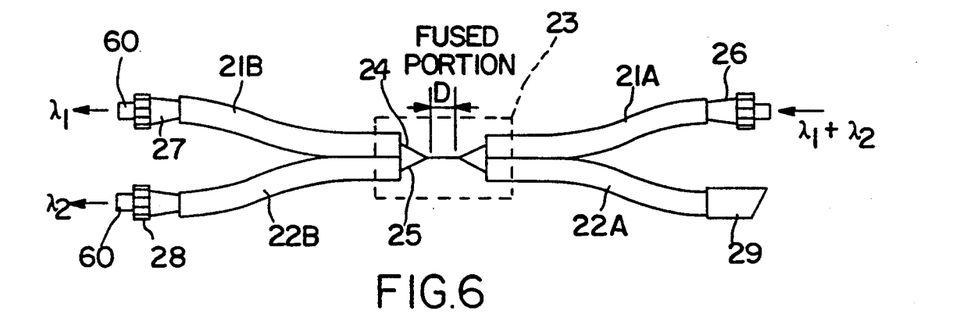
FIG. 6 is an explanatory diagram showing an optical coupler in a first embodiment according to the invention.

A pair of optical wavelength separating filter assemblies 60 each obtained by a process as shown in FIGS. 5A and 5B are incorporated into connectors 27 and 28 of a fusing type optical coupler as shown in FIG. 6, wherein like parts are indicated by like reference numerals, and symbols as used in FIG. 2.

Figure 7A:
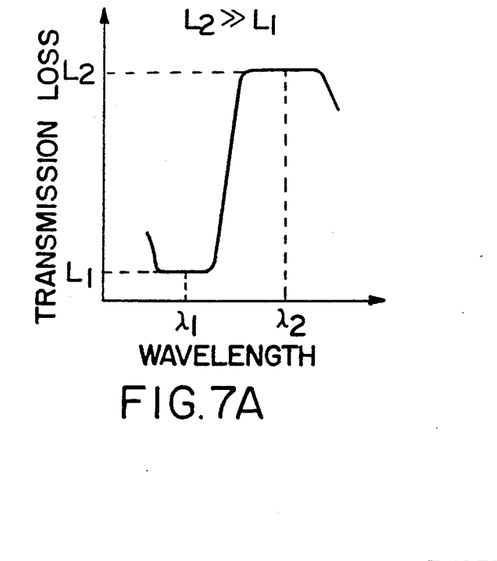
FIGS. 7A and 7B are explanatory graphs showing wavelength pass properties in the first embodiment.
Figure 7B:
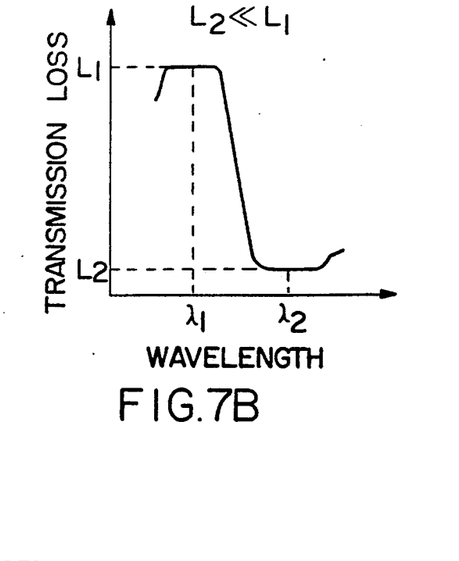

At the connector 27, the optical wavelength separating filter 55 has a wavelength pass and stop property, by which light of a wavelength $\lambda_1$ is passed, while light of a wavelength $\lambda_2$ is stopped as shown in FIG. 7A. On the other hand, the light of the wavelength $\lambda_1$ is stopped at the connector 28, while the light of the wavelength $\lambda_2$ is passed through as shown in FIG. 7B.

In the fusing type optical coupler as shown in FIG. 6, wavelength division multiplexing lights having wavelengths $\lambda_1$ and $\lambda_2$ are incident to the first optical fiber cord 21A, so that the light of the wavelength $\lambda_1$ is obtained from the second optical fiber cord 21B by the existence of the optical wavelength separating filter 55 of the connector 27 while the light of the wavelength $\lambda_2$ is obtained from the fourth optical fiber cord 22B by the existence of the optical wavelength separating filter 55 of the connector 28. Consequently, a high isolation is obtained between the lights of the wavelengths $\lambda_1$ and $\lambda_2$ even in a structure of an optical fiber fusing type of an optical coupler having an advantage in that it is of a simplified and small structure and of a low loss.

Figure 8:
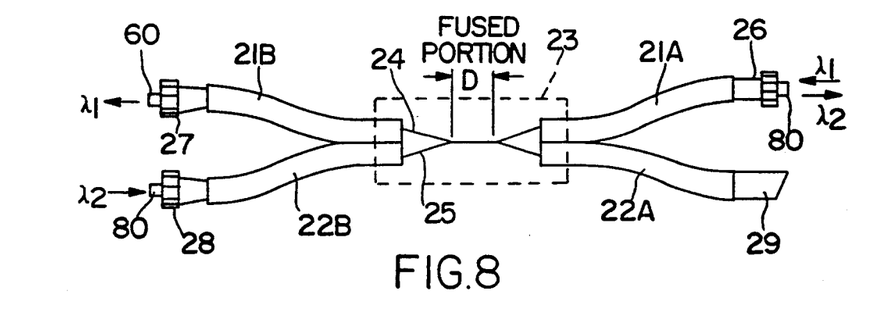
FIG. 8 is an explanatory diagram showing an optical coupler in a second embodiment according to the invention.

FIG. 8 shows an optical coupler in the second embodiment according to the invention, wherein like parts are indicated by like reference numerals and symbols as used in FIGS. 2 and 6, except that a single optical wavelength separating filter assembly 60 which is explained above is provided at the connector 27 of the second optical fiber cord 21B, while ordinary ferrules 80 are provided, respectively, at the connectors 26 and 28 of the first and fourth optical fiber cords 21A and 22B.

In operation, light of the wavelength $\lambda_1$ is supplied to the first optical fiber cord 21A at the connector 26, while light of the wavelength $\lambda_2$ is supplied to the fourth optical fiber cord 22B at the connector 28, so that the light of the wavelength $\lambda_1$ is obtained from the second optical fiber cord 21B, while the light of the wavelength $\lambda_2$ is obtained from the first optical fiber cord 21A. Consequently, a bidirectional optical communication is realized by use of this optical coupler.

Figure 9:
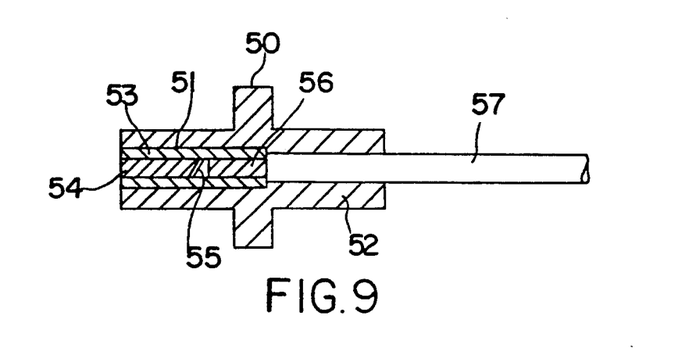
FIG. 9 is a cross-sectional showing a modification of the wavelength separating filter connector.

FIG. 9 shows a modification of an optical wavelength separating filter assembly, wherein like parts are indicated by like reference numerals as used in FIGS. 5A and 5B, except that the optical fiber 54 is shaped to be slant at an end plane, on which the optical wavelength separating filter 55 is provided.

In operation, light reflection is suppressed on the optical wavelength separating filter 55, so that a transmission of a high bit rate is realized.

This optical wavelength separating filter assembly which is shown in FIG. 9 is applied to all or either of the connectors 26, 27 and 28 of the optical coupler as shown in FIG. 6.

Figures 10A, 10B:
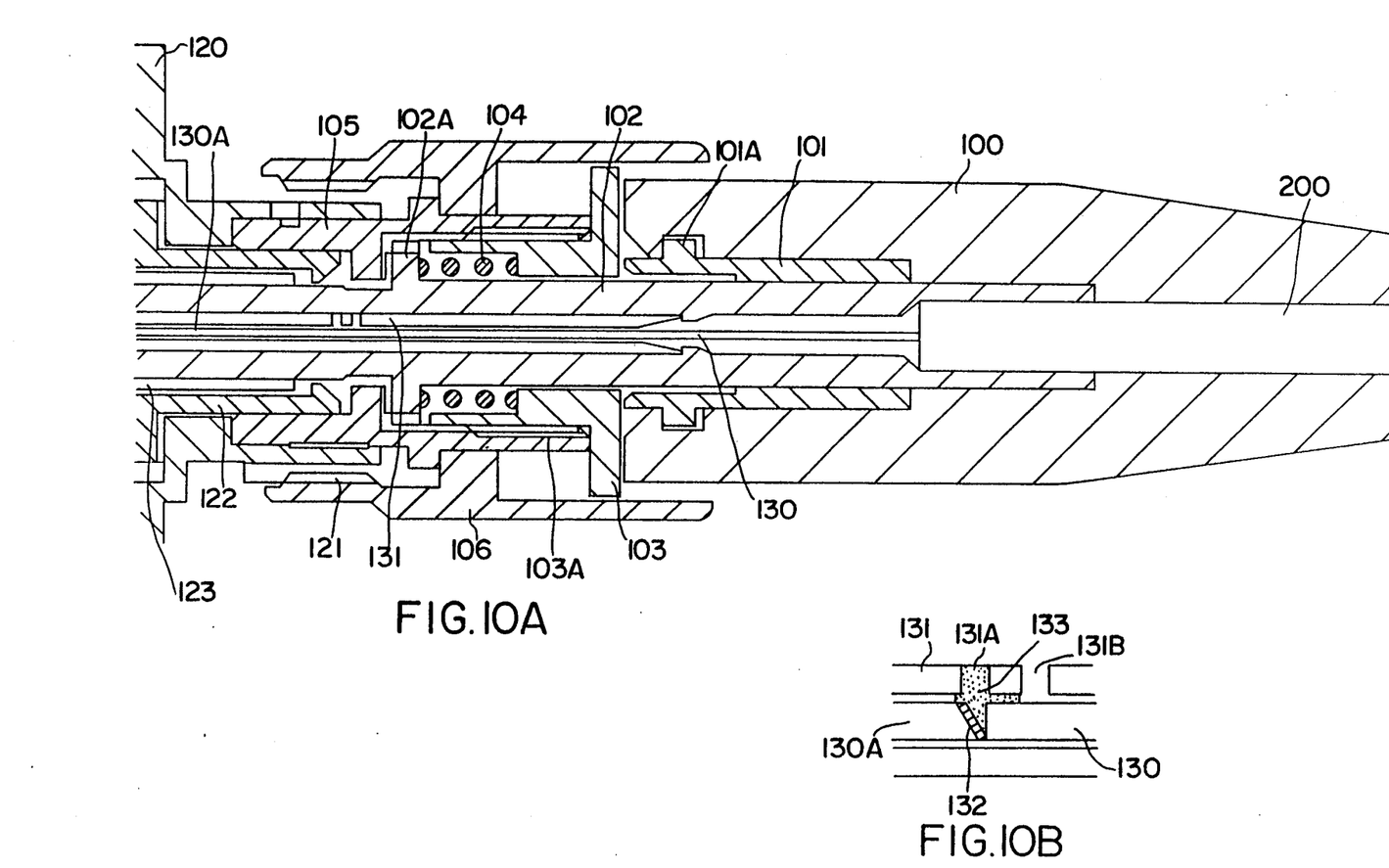
FIGS. 10A and 10B are cross-sectional view showing an optical wavelength separating filter connector in a further modified and detailed structure.

FIGS. 10A and 10B show a more detailed structure of such a connector. In this connector, a rubber member 100 is provided over an optical fiber cord 200 which is inserted at one end into a ferrule 102. A first cylindrical member 101 is provided between an inner periphery of the rubber member 100 and an outer surface of the ferrule 102, such that the cylindrical member 101 is fixed at a partial inner periphery to the ferrule 102, and is engaged with the rubber member 100 by a concave and convex portion 101A. A second cylindrical member 103 is provided in the central portion on the ferrule 102, such that a spring member 104 is partially provided therebetween to force the ferrule 102 in a direction of an adapter 120 due to the engagement of a flange 102A thereof. The cylindrical member 103 is fixed to a third cylindrical member 105 by a screwed portion 103A, and a cylindrical knob 106 is positioned outside the third cylindrical member 105. Where the knob 106 is fixed to a screwed portion 121 of the adapter 120, an end portion of the third cylindrical member 105 is forced between the adapter 120 and a sleeve 122. The ferrule 102 is inserted at one end into a sleeve 123 for the adapter 120, so that an optical fiber 130A inserted in advance through the ferrule 102 is positioned coaxially with the adapter 120. A glass capillary tube 131 having two slits 131A and 131B is inserted in the ferrule 102, such that a slant end plane of the optical fiber 130A is positioned at the slit 131A to have an optical wavelength separating filter 132 thereon. A refractive index matching material 133 is injected into a gap between the optical fiber 130A and an optical fiber 130 extended from the optical fiber cord 200. The matching material 133 is not leaked outside the capillary tube 131 in the presence of the slit 131B.

Figures 11, 12:
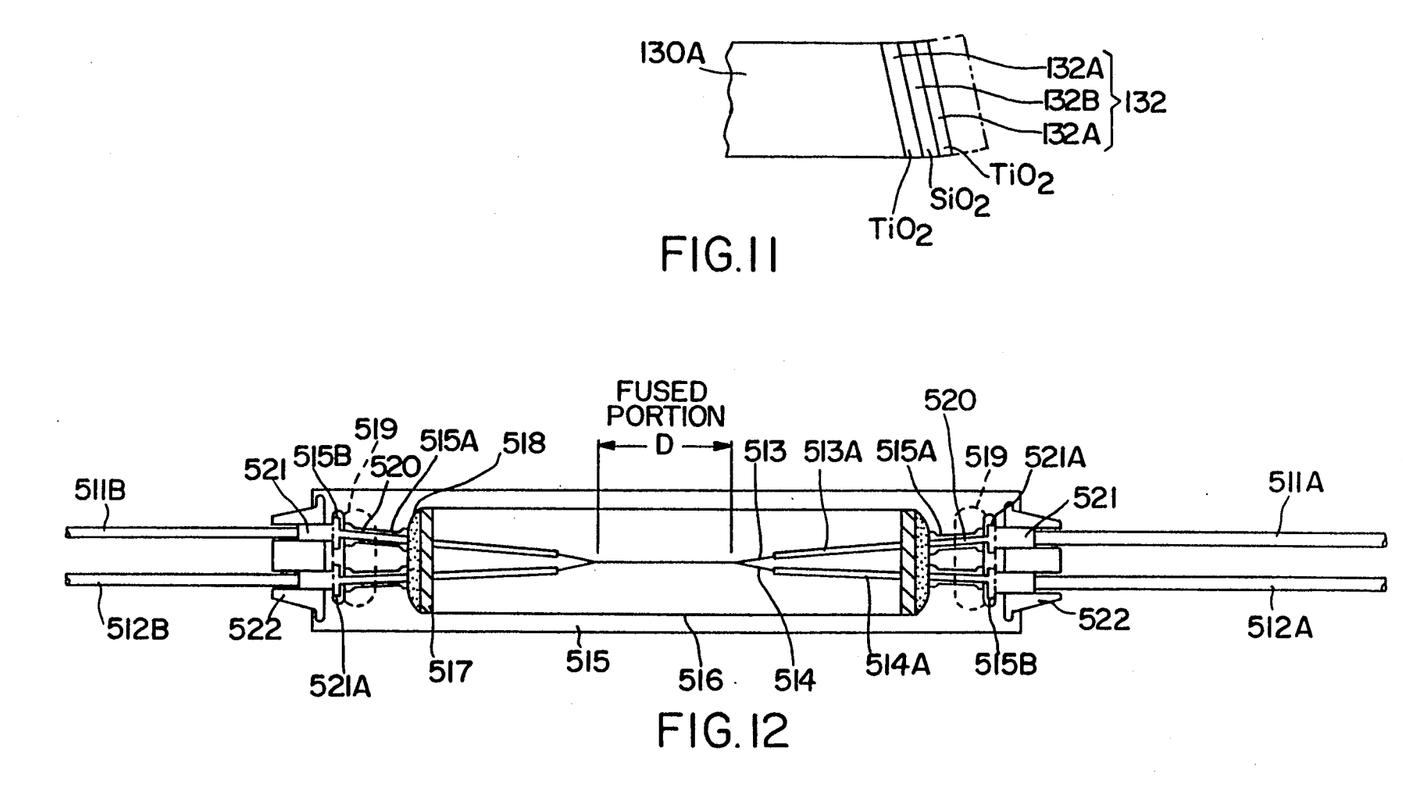
FIG. 11 is an enlarged diagram showing an optical wavelength separating filter film used in FIGS. 10A and 10B.
FIG. 12 is a cross-sectional view showing an optical coupler in a third embodiment according to the invention.

FIG. 11 shows the optical wavelength separating filter 132 provided on the slant end plane of the optical fiber 130A. The optical wavelength separating filter 132 comprises films 132A of $TiO_2$ and films 132B of $SiO_2$, each of which is alternately provided on the other, and has a thickness of $\lambda/4$, where $\lambda$ is a selected wavelength. In fact, a refractive index of $TiO_2$ is larger than that of $SiO_2$. Such a multi-layer dielectric film is described in the U.S. Pat. No. 2,519,722 to provide a wavelength selecting filter.

FIG. 12 shows an optical coupler in the third embodiment according to the invention.

Optical fibers 513 and 514 each including a core and a cladding layer are fused to each other at a fused portion D in a glass tube 516 in a plastic package 515. The optical fiber 513 and 514 are covered by protective layers, thereby providing optical fiber cords 511A and 511B, and optical fiber cords 512A and 512B. The optical fibers 513 and 514 covered by jackets 513A and 514A are fixed at both ends of the glass tube 516 by a dual structure of epoxy system adhesives 517 and silicon rubber system adhesives 518. The optical fibers are inserted into apertures 515A of the plastic package 515 to be fixed thereto by silicon rubber system adhesives 519 in a state that the optical fibers are covered by plastic tubes 520. The optical fiber cords 511A, 511B, 512A and 512B are fixed at top ends to cylindrical metal members 521 which are inserted into sockets 522 and inserted at flange portions 521A into flat apertures 515B of the plastic package 515. A rid (not shown) is applied over the plastic package 515 to be engaged to the plastic package 515.

In the preferred embodiments, the capillary tube may be of glass. The refractive index matching material may be of either a refractive index matching adhesives or glease. As a matter of course, light signals are not limited to wavelength division multiplexing lights. Furthermore, an optical wavelength separating filter film may be provided on an end plane of an optical fiber selected from two optical fibers facing each other to be in contact with each other in a capillary tube, wherein the end plane is preferably processed to have a mirror surface.

According to this invention, following advantages are obtained.

(1) Isolation becomes large between separated lights of different wavelengths even in an optical fiber fusing type of an optical coupler to the same extent as a bulk type of an optical coupler.

(2) Loss is small, because two optical fibers are in contact with each other in an aperture of a capillary tube, wherein the aperture is of a precise inner diameter.

(3) The structure is simple as compared to a bulk type optical coupler.

(4) A reflection loss is decreased in a structure in which an end plane of an optical fiber is cut to be slant.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. In an optical coupler having plural light input and output terminals in which lights of more than two different wavelengths are combined or divided, the improvement comprising:
   an optical connector terminal provided at at least one of said light input and output terminals, said optical connector terminal including an optical wavelength separating filter film positioned between end planes of first and second optical fibers, said first optical fiber being provided in advance with said optical wavelength separating filter film on said plane thereof, said first and second optical fiber operatively connected with each other by placing said optical wavelength separating filter film therebetween;
   wherein said optical connector terminal, comprises:
   a capillary tube having aperture into which said first and second optical fibers are inserted; and
   a refractive index matching material is filled into a contacting portion of said first and second optical fibers.

2. An optical coupler, according to claim 1, wherein:
   one selected from said first and second optical fibers is cut at said end plane to be slant, said wavelength separating filter film being provided on said slant end plane.

3. An optical coupler, according to claim 2, wherein:
   said optical input and output terminals are first to fourth terminals provided at both ends of said first and second optical fibers, cores of which are adjacent and parallel at a selected portion by fusing cladding layers provided over said cores.

4. An optical coupler, according to claim 1, wherein:
   said capillary tube has first and second slits at said portion, such that said end plane of said first optical fiber is positioned at a place where said first slit is provided.

5. An optical coupler, according to claim 4, wherein:
   said optical input and output terminals are first to fourth terminals provided at both of said first and second optical fibers, cores of which are adjacent and parallel at a selected portion by fusing cladding layers provided over said cores.

6. An optical coupler, according to claim 1, wherein:
   said optical input and output terminals are first to fourth terminals provided at both ends of first and second optical fibers, cores of which are adjacent to be parallel at a selected portion by fusing cladding layers provided over said cores.

7. An optical coupler in which lights of more than two different wavelengths are combined or divided comprising:
   a coupler portion;
   a plurality of light input and output terminals connected to the coupler portion; and
   an optical connector terminal provided at least one of said light input and output terminals, said optical connector terminal including an optical wavelength separating filter film inserted between end planes of first and second optical fibers operatively connected with each other by placing said optical wavelength separating filter film therebetween said end planes of said first and said second optical fibers being adjacent to the filter and being at different angles allowing a refractive index matching material to fill between said first and second optical fibers.

8. An optical coupler, according to claim 7, wherein:
   said first optical fiber is cut at said end plane to be slant, said wavelength separating filter film being provided on said slant end plane;
   said second optical fiber is cut at said end plane substantially vertical to an axis of said second optical fiber.

9. An optical coupler, according to claim 7, wherein:
   said capillary tube has first and second slits at said portion, such that said end plane of said first optical fiber is positioned at a place where said first slit is provided.

10. An optical coupler, according to claim 7, wherein:
    said optical input and output terminals are first to fourth terminals provided at both ends of first and second optical fibers, cores of which are adjacent to be parallel at a selected portion by fusing cladding layers provided over said cores.

11. An optical coupler, according to claim 7, wherein:
    said filter has a thickness of substantially $\lambda/4$ where $\lambda$ is a predetermined wavelength.

12. An optical coupler comprising:

first and second optical fibers joined along a fused portion and having first ends which extend from one end of the fused portion;

a first connector terminal mounted to the first end of the first optical fiber and including a first filter at the tip of the first optical fiber for passing light having a first optical wavelength; and a second connector terminal mounted to the first end of the second optical fiber and including a second filter at the tip of the second optical fiber for passing light having a second optical wavelength.

13. An optical coupler, according to claim 12, wherein the first optical fiber further includes a second end which extends from the opposite end of the fused portion.

14. An optical coupler, according to claim 13, further comprising a third connector mounted to the second end of the first optical fiber.

15. An optical coupler, according to claim 12, wherein the first filter includes a first optical wavelength separating filter film, for passing light having the first optical wavelength and for filtering out light having an optical wavelength other than the first optical wavelength, the first filter being disposed within the first connector; and the second filter includes a second optical wavelength separating filter film for passing light having the second optical wavelength, and for filtering out light having an optical wavelength other than the second optical wavelength, the second optical wavelength being different from the first optical wavelength, the second filter being disposed within the second connector.

16. An optical coupler, according to claim 15, wherein the first optical wavelength separating filter film is provided at a slant relative to an axis defined by the first optical fiber, for decreasing the reflection loss by suppressing light reflected by the first filter.

17. An optical coupler, according to claim 16, wherein the second optical wavelength separating filter film is provided at a slant relative to an axis defined by the second optical fiber, for decreasing the reflection loss by suppressing light reflected by the second filter.

* * * * *

UNITED STATES PATENT AND TRADEMARK OFFICE
CERTIFICATE OF CORRECTION

PATENT NO. : 5,179,606

DATED : January 12, 1993

INVENTOR(S) : Kaihara et al.

It is certified that error appears in the above-identified patent and that said Letters Patent is hereby corrected as shown below:

Claim 5, col. 8, line 16, after "both" insert --ends--.

Claim 6, col. 8, line 24, change "to be" to --and--.

Claim 7, col. 8, line 33, after "at" insert --at--.

Signed and Sealed this

Fourteenth Day of December, 1993

Attest:

BRUCE LEHMAN

Attesting Officer

Commissioner of Patents and Trademarks